Patented Apr. 21, 1953

2,635,981

UNITED STATES PATENT OFFICE 2,635,981

PROCESS OF TREATING FROTHY BLOAT IN RUMINANTS AND TYMPANIC COLIC IN HORSES

James A. Austin and Karl A. Ratcliff, Mission, Kans., assignors to Jensen-Salsbery Laboratories, Inc., Kansas City, Mo., a corporation of Missouri No Drawing. Application March 23, 1949, Serial No. 83,100

3 Claims. (Cl. 167—53)

This invention relates to improvements in the treatment of frothy bloat in the ruminants cattle, sheep and goats and the ailment variously known as tympanic colic, gastric distension or gastric tympanitis in horses.

Heretofore frothy bloat and tympanic colic have been treated only with difficulty, and while medicaments have been available which are sometimes effective, it has been frequently necessary to use surgical means to relieve the distress.

In accordance with the present invention, frothy bloat in ruminants and tympanic colic in horses is relieved and effectively treated by the administration of an organic silicone or silicate either by injection directly into the rumen or by oral administration, e. g., as a drench, the silicone or silicate being administered in a form in which it is readily dispersed or suspended throughout an aqueous medium. Administration of the silicone or silicate in a hydrophobe solvent, for example, in octyl alcohol or in oil or oil-like solvents, is not nearly as effective in relieving the frothy bloat or tympanic colic, perhaps because it prevents the release of the silicone or silicate and its distribution throughout the food mass. In general, it is advantageous to administer the material in a form in which it is readily dispersed throughout the food mass, for example, in aqueous suspension using a dispersing agent to form a suitable suspension or dispersion, or in the form of a tablet in which the silicone is adsorbed on the carrier, such as kieselguhr, starch or the like, which may then be crushed in water and given as a drench. An aqueous suspension of the material, for example, obtained by emulsifying or suspending it in water with a suspending or dispersing agent such as triethanolamine oleate may be administered by injection, using one of the usual syringes and needles and injecting directly into the rumen or caecum or as a drench.

We have found that with cattle, 1.0 gram of an organic silicone administered either hypodermically in the form of a triethanolamine oleate aqueous suspension or as a drench, as by crushing and suspending in water a tablet having the silicone adsorbed on kieselguhr and using starch, milk sugar and gelloid, granulating and compressing on a tablet machine in the usual way, has shown about 80% effectiveness without the use of any surgical procedures, in marked contrast to the treatments which have heretofore been available for the treatment of this affliction. It is possible that some of the failures in this clinical work resulted from administration in such a way as to introduce the silicone into the true stomach rather than into the rumen, and that if proper administration had been obtained in all cases, the level of effectiveness would have been even higher. A suspension of the silicone, injected directly into the rumen, has shown an effectiveness of about 90%.

The organic silicones which are used in the practice of the invention are the polymerized dihydrocarbon silicones of the general formula

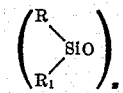

in which R and $R_1$ represent hydrocarbon groups, usually but not necessarily alike, which may range from $C_1$ (methyl) to $C_8$ (octyl) or may be alicyclic (e. g., cyclohexyl) or aryl (e. g., phenyl) or aralkyl (e. g., benzyl). In general, compounds in which the groups R and $R_1$ are lower alkyl groups (amyl or lower) are most valuable. The organic silicates used are the corresponding products in which the hydrocarbon groups are linked to the silicon through oxygen, instead of being directly linked to the silicon, i. e., of the formula

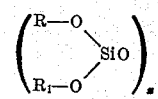

Dimethyl silicone polymer has been shown to be particularly effective. These organic silicones and silicates are well known materials, and description of their production is therefore unnecessary. Satisfactory methyl silicones are available in the open market. Thickening agents, such as colloidal silica, may be included in the silicone composition if desired.

Thus, a silicone which we have found highly effective is a high molecular weight methyl silicone thickened with a non-crystalline form of silica in the colloidal state. One such product is available on the market under the trade name of "D C Antifoam A," sold by The Dow Corning Company. It was this product which was used in the clinical tests referred to above, with administration of 1.0 gram, either in the form of the aqueous suspension using triethanolamine oleate as the suspending or dispersing agent, or in the form of a tablet which was crushed in water and administered as a drench.

The following are typically useful products embodying the invention:

*Example I.*—8 pounds of powdered milk sugar, 3 pounds of starch, 1 pound of kieselguhr, 500 grams of high molecular weight dimethyl silicone (D C Antifoam A), 1 pint of ether (solvent for the silicone), 10 grains of oil soluble yellow color, 4 ounces of gelloid and 1 gallon of starch paste are admixed, passed through a #16 screen and dried, 4 ounces of talcum, 12 ounces of starch, 1 ounce of octyl alcohol and 120 min. of oil of peppermint are added and the mixture compressed into tablets, each containing 0.5 gram of the silicone.

*Example II.*—80 grams of oleic acid are warmed slightly and added to 20 grams of triethanolamine and the mixture stirred until a smooth, homogeneous paste is obtained. 10 grams of high molecular weight dimethyl silicone and 2 cc. of oil of peppermint are stirred in and water to make 1000 cc. is then slowly added, with stirring until an even suspension is obtained.

We claim:

1. The process of treating frothy bloat in ruminants and tympanic colic in horses which comprises introducing into the frothy food mass responsible for distress a material of the class consisting of organic silicones and organic silicates.

2. The process of treating frothy bloat in ruminants and tympanic colic in horses which comprises introducing into the frothy food mass responsible for distress an organic silicone.

3. The process as in claim 2 in which the organic silicone is a high molecular weight methyl silicone.

JAMES A. AUSTIN.
KARL A. RATCLIFF.

References Cited in the file of this patent

UNITED STATES PATENTS

| Number | Name | Date |
|---|---|---|
| 2,375,007 | Larsen | May 1, 1945 |
| 2,443,067 | Burns | June 8, 1948 |
| 2,512,192 | Yen | June 20, 1950 |

OTHER REFERENCES

Rowe—Journal of Industrial Hygiene and Toxicology, November 1948, pages 332 to 352.

Hutyra—Pathology and Therapeutics of the Diseases of Domestic Animals, volume 2 (1938), pages 72 to 76.

Pearson — Diseases of the Horse (1916), page 73.

Dow Corning Silicone Note Book (September 1948), page 30.

Shepherd—Washington Post, December 24, 1951, page 5B.